(12) United States Patent
Hibbard et al.

(10) Patent No.: US 6,266,453 B1
(45) Date of Patent: Jul. 24, 2001

(54) AUTOMATED IMAGE FUSION/ALIGNMENT SYSTEM AND METHOD

(75) Inventors: Lyn Hibbard; Derek G. Lane, both of St. Louis, MO (US)

(73) Assignee: Computerized Medical Systems, Inc., St. Louis, MO (US)

( * ) Notice: Subject to any disclaimer, the term of this patent is extended or adjusted under 35 U.S.C. 154(b) by 0 days.

(21) Appl. No.: 09/360,436

(22) Filed: Jul. 26, 1999

(51) Int. Cl.[7] .................................................. G06K 4/32
(52) U.S. Cl. ........................................... 382/294; 382/131
(58) Field of Search ................................ 382/128, 132, 382/154, 218, 294–299; 250/363.09; 345/424; 378/21, 41, 164, 90, 165, 205; 424/9.3; 600/382, 407, 408, 410, 429

(56) References Cited

U.S. PATENT DOCUMENTS

| | | | |
|---|---|---|---|
| 5,638,819 | * 6/1997 | Manwaring et al. | 128/653.1 |
| 5,709,206 | * 1/1998 | Teboul | 600/437 |
| 5,749,362 | * 5/1998 | Funda et al. | 600/407 |
| 5,778,043 | * 7/1998 | Cosman | 378/65 |
| 5,787,886 | * 8/1998 | Kelly et al. | 600/407 |
| 5,859,891 | * 1/1999 | Hibbard | 378/62 |
| 5,891,034 | * 4/1999 | Bucholz | 600/426 |

OTHER PUBLICATIONS

Hibbard, et al., Jun. 26, 1987 Science vol. 236, "Three–Dimensional Representation and Analysis of Brain Energy Metabolism", pp. 1641–1646.

Brown, L.G.,Dec. 1992 ACM Computing Surveys vol. 24 No. 4, "A Survey of Image Registration Techniques", pp. 325–376.

Van den Elsen, P.A., et al., Mar. 1993 IEEE Engineering in Medicine and Biology, "Medical Image Matching—A Review with Classification", pp. 26–39.

Rosenman, J.G., et al, 1998 Int. J. Radiation Oncology Biol. Phys., vol. 40, No. 1, "Image Registration: An Essential Part of Radiation Therapy Treatment Planning", pp. 197–205.

Anuta, P.E., Oct. 1970 IEEE Transactions on Geoscience Electronics, vol. GE–8, No. 4, "Spatial Registration of Multispectrical and Multitemporal Digital Imagery Using Fast Fourier Transform Techniques", pp. 353–368.

Barnea, D. I., et al., Feb. 1972 IEEE Transactions on Computers, vol. C–21, No. 2, "A Class of Algorithms for Fast Digital Image Registration", pp. 179–186.

Pratt, W. K., May 1974 IEEE Transactions on Aerospace and Electronic Systems, vol. AES–10, No. 3, "Correlation Techniques of Image Registration", pp. 353–358.

(List continued on next page.)

Primary Examiner—Jayanti K. Patel
(74) Attorney, Agent, or Firm—Hale And Dorr LLP

(57) ABSTRACT

A system and method for autofusion of three-dimensional ("3-D") image data volumes is described. According to the system and method, registration is effected by simultaneously displaying on a GUI at least, but preferably, two 3-D, image data volumes, and one of the 3-D image data volumes is held fixed while the other may be scaled, rotated, and translated to align homologous anatomic features. The system and method will simultaneously display the axial, sagittal, and coronal plane views of a region of interest These plane views will be of data volumes that are designed and configured for a system user to "drag" or "position" one volume to a new position in one plane view which will also simultaneously update the data volume in the other two plane views with no apparent lag time. The system and method also includes automated alignment computation based on mutual information ("MI") maximization. The system and method aligns 3-D more efficiently and faster that prior image alignment methods.

28 Claims, 7 Drawing Sheets

OTHER PUBLICATIONS

Pelizzari, C. A., et al., Jan./Feb. 1989 Journal of Computer Assisted Tomography, vol. 13, No. 1, "Accurate Three-Dimensional Registration of CT, PET, and/or MR Images of the Brain", pp. 20–26.

van Herk, M., et al., Jul. 1994 Medical Physics, vol. 21, No.7, "Automatic Three-Dimensional Correlation of CT-CT, CT-MRI, and CT-SPECT Using Chamfer Matching", pp. 1163–1178.

Viola, P., et al., Jun. 1995 Proc of the Vth Int'l Conf. On Computer Vision, "Alignment by Maximization of Mutual Information", pp. 16–23.

Collignon, A., et al., Apr. 1995 Proc. of the Xvth Int'l. Conf. On Computer Vision, Virtual Reality, and Robotics In Medicine, (CVRMed '95), vol. 905, "Automated Multi-Modality Image Registration Based On Information Theory", pp. 263–274.

Maes, F., et al., Jun. 1996 IEEE Proceedings of MMBIA, "Multi-Modality Image Registration by Maximization of Mutual Information", pp. 14–22.

Studholme, C., et al., 1996 Medical Image Analysis, vol. 1, No.2, "Automated 3-D Registration of MR and CT Images of the Head", pp. 163–175.

* cited by examiner

AUTOMATED IMAGE FUSION/ALIGNMENT SYSTEM AND METHOD

FIELD OF THE INVENTION

The present invention relates to systems and methods for aligning image data volumes. More specifically, the present invention relates to aligning three-dimensional image data volumes.

BACKGROUND OF THE INVENTION

In the medical treatment area, it is usually necessary to utilize a number of modalities to view the internal anatomy of the person to be treated. These modalities include X-ray imaging, Magnetic Resonance Imaging ("MRI"), and computed tomography ("CT") imaging. There also are other modalities such as functional MRI ("fMRI"), single photon emission computed tomography ("SPECT"), and positron emission tomography ("PET"), all of whose images contain physiologic or metabolic information depicting the actions of living tissue.

It is known that each of modalities has certain strengths and weaknesses in the images that it produces. For example, X-radiography ("X-ray") imaging has high spatial and intensity resolutions, shows bony anatomy with high detail, and is relatively inexpensive to use; but X-ray also presents the viewer with complex two-dimensional ("2-D") views of superimposed anatomy. X-radiography also has difficulty resolving soft tissue features. MRI has the advantage of displaying three-dimensional ("3-D") images of soft tissues with high contrast and high spatial resolution, but does not image bone well. CT imagery, based on X-ray absorption, produces 3-D pictures of bony anatomy, and, increasingly, good definition of soft tissue, although MRI remains the preferred modality for viewing soft tissue. However, if the correct modalities are selected and aligned, the resulting combined image data will provide a more complete representation of the internal anatomy of the patient. Given this, the issue is to identify a system and method that will align image data from two modalities very accurately in a reasonable amount of time.

Image alignment, which is part of the science of image fusion, has been used since at least World War II when time course aerial photography was used to support strategic bombing. Blink comparator machines were used to superimpose two images taken at different times by displaying them to the viewer in rapid succession. As these images were being displayed in this manner, their features were matched to quantify the bombing damage.

This same basic comparison technique has been used to superimpose images produced by remote sensors, for example aerial or satellite sensors, but with the refinement of using computer-based methods to align images produced at different times, or at the same time by different channels of the sensor. These images were digital images. The techniques just described for image alignment in remote sensors were reported in Castleman, K. R., "Digital Image Processing" Prentice-Hall. Englewood Cliffs, N.J., 1979, and Moik, J. G., "Digital Processing of Remotely Sensed Images," NASA SP-431, Washington, D.C., 1980.

The use of computers to effect image alignment became a necessity as the number of images produced by LANDSAT, SPOT, and other satellite systems rapidly rew and there was the need to perform nonlinear warping transforms to match the images taken from different sky-to-ground perspectives. The use of computers also became a necessity to effect alignment of brain tissue images so that useful and effective neurophysiological research could be conducted. This was reported in Hibbard, L, et al., Science, 236:1641–1646, 1987. Reviews of various computed alignment techniques have been reported in Brown, L. G., "A Survey of Image Registration Techniques," ACM Computing Surveys, 24: 325–376, 1992 and Van den Elsen, P.A., et aL, "Medical Image Matching—A Review with Classification," IEEE Engineering in Medicine and Biology, March 1993, pp. 26–39.

Image fusion of images from at least two modalities is currently being used in radiation onocology because it has been found to provide better tumor definition, which was reported in Rosenman, J. G., et aL, "Image Registration: An Essential Part of Radiation Therapy Treatment Planning," International Journal of Radiation Onocology, Biology, and Physics, 40:197–205, 1998. It is anticipated that there will be increased development of software tools for the use in radiation treatment planning ("RTP") to effect image alignment and display/contouring tools to process and use the fused images that are produced.

Image alignment methods generally fall in two categories: manual alignment by direct inspection of the images being aligned, and automatic alignment by computing a solution to a numerical problem with some type of computer program. Manual alignment ("MA") is carried out visually by matching corresponding features of two images. MA may be implemented in all RTP systems that offer or purport to offer image fusion The mechanism that most frequently is used in MA is the visual placement of fiducial points or markers from which a transformation is derived, for example, by a least-square minimization of the differences between corresponding landmark points. A method of implementing MA that is not as frequently used is the visual matching of objects imbedded directly in the images being aligned.

MA is usually carried out using a graphical user interface ("UGU"). In most cases, the GUI simultaneously displays the axial, sagittal, and coronal plane views of an area of interesl The GUI must provide efficient navigation of 3-D data, and precise localization of fiducial markers or other tools for alignment or measurement Heretofore, commercial systems have used UNIX workstations or special-purpose computers to achieve the high computation and graphics throughput needed to interactively display large data volumes Automated image alignment ("AIA") methods involve obtaining a transformation through computation of the properties of the images to be registered. This may even take place through programmed computer actions without user intervention. Many of the more successful AIA methods are based on correlation and moment invariants matching.

Correlation methods, more accurately, involve the cross-correlation or cross-covariance of image pixel intensities. These methods produce robust and accurate alignments of images. Methods of this type have been reported in Anuta, P. E., "Spatial Registration on Multispectral and Multitemporal Digital Imagery Using Fast Fourier Transform Techniques," IEEE Transactions on Geoscience Electronics, 8:353–368, 1970; Bamea, D. I., et al., "A Class Of Algorithms For Fast Digital Image Registration," IEEE Transactions on Computers, 21:179–186, 1972; and Pratt, W. K., "Correlation Techniques of Image registration," IEEE Transactions on Aerospace and Electronic Systems, 10:353–358, 1974.

According to most correlation methods, the location of the correlation peak will correspond directly to the translation needed to align images that already have a correct rotational alignment. The rotational alignment may have been obtained by correlating the images after resampling them on a polar grid according to the method reported in Hibbard, L, et al., *Science* 236:1641–1646, 1987. This rotational alignment method depends on the use of a fast Fourier transform. Correlation methods are accurate and robust to noise and differences in image content as long as the images are not too different. Accordingly, correlation methods are most often used for the alignment of images of the same kind.

Moment invariants methods are computed methods for image registration. A example of these methods is reported in Jain, A. K., "Fundamentals of Digital Picture Processing, *Prentice-Hall* Englewood Cliffs, N.J., 1989. This moment invariants method involves the use of the principal moments computed from a two-dimensional ("2-D") inertia matrix of some prominent object of the images. The principal moments correspond to a unique set of principal vectors. Image alignment is performed by transforming one image's principal vectors onto the other image's principal vectors. This usually is a fast calculation. However, the moment invariants method depends on the ability to efficiently extract the object or set of objects that serve as the moment fiducials. This method has considerable problems if the images are complex and have no dominant single feature for the alignment of images of the same kind or modality.

Besides the moment invariants method just discussed, there are other alignment methods based on invariant properties. These other methods may use geometric invariants, and minima/maxima of curvature and other extrema. At least one of these methods is reported in Lavellee, S., "Registration for Computer Integrated Surgery: Methodology, State of Art, in Taylor, R., et al, *Computer Integrated Surgery,* MIT Press, Cambridge, Mass., 1996. The characterization of these methods are that they are fast but susceptible to noise and inter-subject differences. These systems, however, only use a small portion of all of the available information from each image set to compute the registration, which has some effect on the accuracy.

In a practical sense, the automated alignment of CT and MRI images of the head was accomplished in the late 1980's and early 1990's. The methods that were used at that time gained some level of use but they had drawbacks. These methods were reported in Pelizzari, C. A. et al., "Accurate Three-dimensional Registration of CT, PET, and/or MR Images of the Brain," *Journal of Computer Assisted Tomography,* 13:20–26, 1989.

The method described in Pellzzari, et al. suggests representing the surface of the brain in CT and MRI by stacks of contours of the cortical surface and minimizing the least-squares differences between neighboring points in the two surfaces to determine the alignment transform. This method was later refined by sub-sampling the surface points and then applying simple optimization to determine the transformation. This late refinement was reported in Van Herk, M. and Kooy, H. M., "Automatic Three-Dimensional Correlation of CT—CT, CTMRI, and CT-SPECT Using Chamfer Matching," *Medical Physics,* 21:1163–1178, 1994. It was found that the original and refined methods were useful only for the head, and both methods required that the cortical surface be manually contoured first.

Another automatic method that has been suggested for the registration of images is based on the maximization of mutual information and this method was first reported on in 1995. This method has its genesis in information theory in which the relatedness of one random variable for another is based on the measure of the variables' entropies, which is referred to as mutual information ("MI").(See, Cover, T. and Thomas, J, *Elements of Information Theory,* John Wiley and Sons, New York, 1991). Thus, for two images, the MI is small if the images are unrelated, or related but unregistered. If the images registration is improved, their MI increases and is maximized when the images are geometrically aligned The MI is different from correlation in that systematic differences between images which would confound correlation actually strengthen the alignment by MI. MI is frequently used for two- and three-dimensional alignment of multimodal imagery in medical science as reported in Wells, W. M., et al., "Lecture Notes In Computer Science," Vol. 1496, Springer-Verlag, N.Y., 1998.

The use of MI has also been the subject of a number of studies. For example, it has been used for aligning multimodal MRI and MRI with CT as reported in Viola, P. and Wells, W. M., "Alignment by Maximization of Mutual Information," *Proc. of the Vth Int'l. Conf. on Computer Vision,* Cambridge, Mass., June 1995, pp. 16–23; Collignon, A., Vandermeulen, D, et. al., Automated Multimodality Medical Image Registration Based On Information Teory," in Bizais, Y., et al., *Proc. of the XVth Int'l. Conf. on Computer Vision, Virtual reality, and Robotics in Medicine (CVRMed '95),* Vol 905, Springer-Verlag, *Lecture Notes in Computer Science,* Nice, France, April 1995, pp. 263–274; Meas, F., et al., "Multi-Modality Image Registration by Maximization of Mutual Information," *IEEE Workshop on Mathematical Methods in Biomedical Image Analysis,* San Francisco, Calif., Jun. 21–22, 1996, pp. 14–22; and Studholme, C., et al., "Automated 3-D Registration of MR and CT Images of the Head," *Medical Image Analysis,* 1:163–175, 1996. Among other things, the issue with MI, however, is the ability to perform it in a time effective manner.

In 1997, the Vanderbilt Retrospective Brain Registration study was conducted. This study was directed to computed alignment methods with the goal of assessing the error of each of the standard group of head data sets comprising CT+MRI or PET+MRI data sets in which "gold standard" alignments (alignments by which the others were judged) were measured using bone-implanted markers. In the study, evidence of the markers were removed from the images before being sent to the participating laboratories. The techniques used by the testing laboratories included variations of the surface matching, correlation, and MI. The errors in respective results varied greatly. There were at least fourteen methods used to align CT and MRI images. Two of the laboratories that used MI achieved the lowest total median error over the spectrum of MRI pulse-sequence modalities. The third best results were achieved by a correlation method. In a comparison of alignments using PET and MRI, the first and second lowest total median errors were achieved by a single correlation method followed by two MI methods. In summary the MI and correlation methods produced the lowest errors and did not require brain contouring, scalp removal, or other interactive activities. Although these methods showed some success, it is believed that the time to solution could be very much improved without sacrificing accuracy.

The present invention provides a system and method that includes an automated alignment method that is accurate but much faster that the prior art systems and methods; and the system and method of the present invention includes an interactive alignment method that achieves speeds and displayed detail equal to, or exceeding, the highest performance level of the prior art, without the need of specially configured or extremely powerful high performance workstations.

SUMMARY OF THE INVENTION

The present invention is a system and method for autofusion and in particular autofusion of three-dimensional ("3-D") image data volumes. According to the system and method of the present invention, registration is effected by simultaneously displaying on a GUI at least, but preferably, two 3-D, image data volumes, and one of the 3-D image data volumes is held fixed while the other may be scaled, rotated, and translated to align homologous anatomic features. The system and method will simultaneously display the axial, sagittal, and coronal plane views of a region of interest Preferably, these plane views will be data volumes that are designed and configured for a system user to "drag" or "position" one volume to a new position in one plane view which will also simultaneously update the data volumes as displayed in the other two plane views with no apparent lag time. The system and method of the present invention also includes automated alignment computation based on mutual information ("MI") maximization. The system and method of the present invention using MI maximization aligns 3-D more efficiently and faster than prior image alignment methods.

According to the system and method of the present invention, the display and automated alignment referred to above have that advantage of achieving high speed updates of the data volumes on the display while at the same time displaying the data in full resolution. The system and method accomplish this following specific strategies. First, the composite transformations of two independent data volumes are represented as a pair of homogeneous matrices whose product directly generates the point in one system homologous to a given point in the other system. Second, the volume data transformation is recast from matrix multiplication of real-valued vectors to the addition of integer vectors that have components which approximate the real-valued vector components. Third, there is a determination of that portion of a row or column of data that will be visible for display or lie in the space of the fixed data, for automated alignment, before performing the transformation and resampling.

Autofusion according to the present invention is characterized as the alignment and combined use of multiple kinds of images of a region of interest. This combined use of the multiple kinds of images permits the extraction of information about the region of interest that would be unavailable from any one of the images. As such, the registration or alignment process is one that spatially matches homologous objects of various images and a process for extracting synergistically derived information.

Autofusion of the present invention is carried out with initial manual selection of images to be aligned, followed by either manual alignment using the GUI or by automated alignment. The alignment methods may be used in either order, or repeatedly in any order, without restriction. More specifically, this involves the interactive matching of image objects using a graphical user interface ("GUI") and an automated method to compute the estimated alignment of the two images without user interaction. These combined actions according to the present invention are complementary and the alignment that is produced is more accurate and time effective than prior methods.

The manual selection and initial superimposition of the two images is done with the GUI. The automated alignment uses a computed MI maximization method that automatically scales, and finds the translations and rotations that will produce the best correspondence of the images. At least one embodiment of the present invention contemplates that the geometric transformation that is applied to the movable data volume is for linear transformations involving six degrees of freedom: three translations and three rotations.

The system and method of the present invention will described in greater detail in the remainder of the specification referring to the drawings.

DETAILED DESCRIPTION OF THE DRAWINGS

Figure 1:
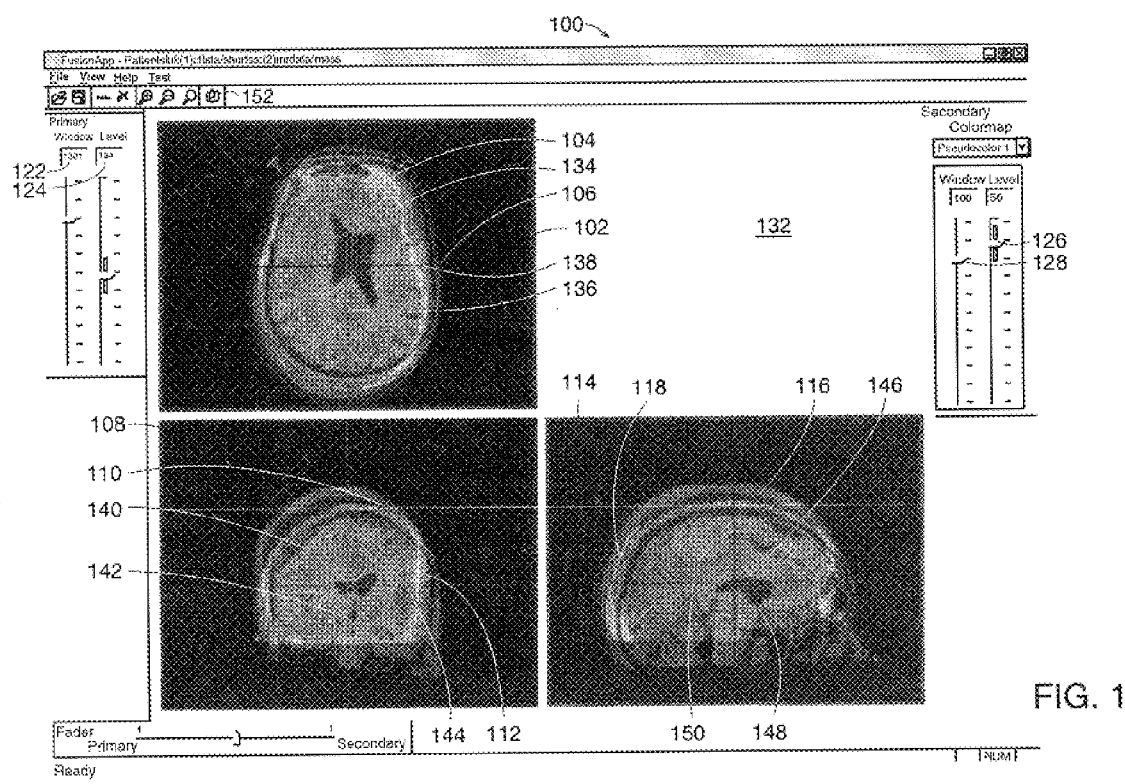
FIG. 1 is a perspective view of the GUI employing the present invention that shows the unaligned CT and MRI images of the same patient in the transverse, coronal and sagittal planes.

The present invention is a system and method for autofusion of three-dimensional ("3-D") image data volumes. According to the system and method of the present invention, autofusion is effected by simultaneously displaying on a GUI at least, but preferably, two 3-D, image data volumes, and one of the 3-D image data volumes is held fixed while the other may be scaled, rotated, and translated to align homologous anatomic features. The system and method will simultaneously display the axial, sagittal, and coronal plane views of a region of interest. Preferably, these plane views will display the voxel intensities on 2-D planes within the data volumes, whose locations within the data volume are specified by the locations of straight-line cursors in the GUI axial, coronal, and sagittal windows, such as "dragging" a cursor in any window specifies a new location for one of the plane views, and that plane view is immediately updated with no lag apparent to the user. In a second method of operation, one of the two data volumes may itself be "dragged" with a cursor to effect a rotation or translation with respect to the fixed data volume. This will cause all three views, axial, coronal, and sagittal, to be redisplayed with no lag apparent to the user. In a third method of operation, the movable data volume may "jump" and "twist" in real-time response to the latest, "best," alignment obtained during the maximization of mutual information determination. Autofusion of the present invention also includes automated alignment computation based on mutual information ("MI") maximization. The system and method of the present invention using MI maximization of aligns 3-D more efficiently and faster that prior alignment methods.

Autofusion of the present invention is carried out with an initial manual selection of images to be aligned, followed by either manual alignment using the GUI or by automated alignment. The alignment methods may be used in either order, or repeatedly in any order, without restriction. That is, first, there is interactive matching of image objects using a graphical user interface ("GUI") and then there is an automated method to compute the estimated alignment of the two images without user interaction. This combination produces more accurate alignments than prior methods.

Autofusion, according to the present invention, involves the registration of different image volumes by interactive matching of image objects using a GUI and automated computation of alignment. The use of the GUI provides the system user with a three views of the 3-D data volumes at issue, and permits the system user to translate and rotate the image data of one modality with respect to the other. For example, the desire may be to autofuse CT and MRI studies. For the purposes here each study is in the form of a data volume. The CT image data will be in a fixed position of the GUI while the MRI image data may be rotated and translated with respect to the CT image data. In this case, the CT image data is referred to as the primary data set and the MRI image data is referred to as the secondary data set. The primary and secondary data sets will have window and level controls on the GUI. There also will be a slider control at the GUI for controlling the intensity of the primary and secondary data sets in the windows.

The display (through the GUI) and automated alignment achieve both high speed updates of the GUI while displaying the data at full resolution. Autofusion of the present invention depends at least in part on (i) representing the composite transformations of the two independent data volumes as a pair of homogeneous matrices whose product, with that of the transformation, directly generates the point in secondary system homologous to a given point in the primary system; (ii) the volume data transformation is recast from matrix multiplication of real-valued vectors to the addition of integer vectors whose components approximate the real vector components; and (iii) determining the portion of a row or column of data which will be visible on the display or will lie in the space of the fixed data (for automated alignment) before performing the transformation and resampling so that needless transformation are not carried out.

In the practical application of the present invention, autofusion will align two 3-D image data volumes for use in RTP Typically, this will consist of aligning one X-ray CT study set and one MRI study set. The alignment of the images of these two modalities is to augment the CT anatomic information with greater soft tissue detail that is seen in MRI imagery: the contours of soft tissue organs and tumors after better shown in MRI than in CT. If the two modalities are accurately superimposed, the MRI images, where needed, can substitute for what is not shown or not shown well in the CT images. Autofusion of the present invention may also employ specific tissue functional information from nuclear medicine imagery (SPECT, PET) or functional MRI imaging (FMRI) which may be helpful to obtain more accurate and effective treatment Referring to FIG. 1, generally at 100, a representative GUI is shown for use in the present invention. Then present invention is preferably for aligning a primary (CT) and secondary (MRI) image data to aid in contouring tissue, although many other uses are contemplated by the inventor.

In FIG. 1, the transverse or axial plane view of the primary and secondary data sets is shown at window 102. The primary data set is shown at 104 and the secondary is shown at 106. The coronal plane view of the primary and secondary data sets is shown at window 108. The primary data set is shown at 110 and the secondary is shown at 112. The sagittal plane view of the primary and secondary data sets is shown at window 114. The primary data set is shown at 116 and the secondary is shown at 118. In each of the windows, the primary and secondary data sets have contrasting colors or one set could be colored and the other black and white. However, all that is necessary is that the two sets be colored so that they may be distinguishable. This is necessary so the user can tell how the secondary is being rotated and translated with respect to primary. As is readily seen by reviewing windows 102, 108, and 114 and the contrasting colors of the two data sets, the primary and secondary data sets are unaligned. The blank area 132 will remain this way until MI maximization is performed at which time the MI levels will be displayed as will be discussed subsequently.

Again referring to FIG. 1, the primary window control is shown at 122 and primary level control is shown at 124. Primary window control 122 is used to select the window from the primary data set that will be displayed in windows 102, 108, and 114. As such, the number 1301 indicates that the primary data in an interval 1301 intensity units wide, centered on the level value of 164, is displayed. Primary level control 164 is used to set the intensity level for the primary data set displayed in windows 102, 108, and 114. Thus, the number 164 indicates that the primary data in an interval 1301 intensity units wide, centered on the level value of 164, is displayed.

In a similar fashion, the secondary window control is shown at 126 and secondary level control is shown at 128. Secondary window control 126 is used to select the window from the secondary data set that will be displayed in windows 102, 108, and 114. As such, the number 100 indicates that the secondary data in an interval 100 intensity units wide, centered on the level value of 50, is displayed. Secondary level control 128 is used to set the intensity level for the secondary data set displayed in windows 102, 108, and 114. Thus, the number 50 indicates that the secondary data in an interval 100 intensity units wide, centered on the level value of 50, is displayed.

At the bottom of GUI 100 is a slider with the labels "Primary" and "Secondary" at respective ends. Movement of the control will increase and decrease the intensity of the secondary with respect to the primary. Accordingly, if the user wants to emphasize the primary data set more than the secondary data set, he or she will move the control closer to the "Primary" label; and if the user wants to emphasize the secondary data set more than the primary data set, he or she will move the control closer to the "Secondary" label. The use of this control is important in selecting and aligning the primary and secondary data sets on the GUI.

Referring to FIG. 1, windows 102, 108, and 114 each have a circle and two line-cursors. More specifically, window 102 has circle 134, vertical line-cursor 136, and horizontal line-cursor 138; window 108 has circle 140, vertical line-cursor 142, and horizontal line-cursor 144; and window 114 has circle 146, vertical line-cursor 148, and horizontal line-cursor 150. The two line-cursors in each window depict the locations of the other two plane views in data volume. Referring to window 102, horizontal line-cursor 138 shows the location of the coronal section shown in window 108 and vertical line-cursor 136 shows the location of the sagittal section shown in window 114. Similarly, referring to window 108, horizontal line-cursor 144 shows the location of the transverse or axial section shown in window 102 and vertical line-cursor 142 shows the location of the sagittal section shown in window 114. Finally, referring to window 114, horizontal line-cursor 150 shows the location of the transverse or axial section shown in window 102 and vertical line-cursor 148 shows the location of the coronal section shown in window 108.

Movement of vertical line-cursor 136 in window 102 will cause the sagittal plane view in window 114 to pan and movement of horizontal line-cursor 138 in window 102 will cause the coronal plane view in window 108 to pan. Likewise, movement of vertical line-cursor 142 in window 108 will cause the sagittal plane view in window 114 to pan and movement of horizontal line-cursor 144 in window 108 will cause the transverse or axial plane view in window 102 to pan. Lastly, movement of vertical line-cursor 148 in window 114 will cause the coronal plane view in window 108 to pan and movement of horizontal line-cursor 150 in window 102 will cause the transverse or axial plane view in window 102 to pan. The movement of these line-cursors permit the user to navigate the data volumes that are shown, through the simultaneous updating of the affected views with each movement of the line cursors.

Circles 134, 140, and 146 in windows 102, 108, and 114, respectively, indicate the areas where the user may engage a particular window view to manually rotate or translate the secondary image. Thus, the GUI cursor, which is to be distinguished from the vertical and horizontal line-cursors, is positioned within and without the a circle to effect rotating and translating the MRI data set (the secondary data set). If the GUI cursor is placed within the circle and engaged, it may be used to translate the secondary image in two directions in the plane of the window. This translation will be evidenced in the other two plane views simultaneously. If the GUI cursor is placed outside of the circle and engaged, it may be used to rotate the secondary image about the center of the plane of the window. The rotation will be evidenced in the other two plane views simultaneously.

When two data volumes for registration are selected, the first action is the manual manipulation of the unaligned views. This will involve the selection of the proper primary and secondary window views, and the desired intensity levels for these two window views. The relative intensity between the primary and secondary images may be controlled by slider control 130. Once the proper views and levels are selected, the line-cursors of the respective windows are used to obtain suitably informative views of the primary and secondary data sets in each of the windows. Following this, the GUI cursor is positioned within and without the circles of each window to translate and rotate the secondary images for alignment of the secondary (movable) image with the primary (fixed) image.

Automated alignment, using MI maximization, may be performed before, after, or instead of, manual alignment. Automated alignment is initiated by activation of automated alignment control shown at 152 in FIG. 1. The activation of the automated alignment control will cause the improved alignment of the secondary image on the primary image.

Figure 2:
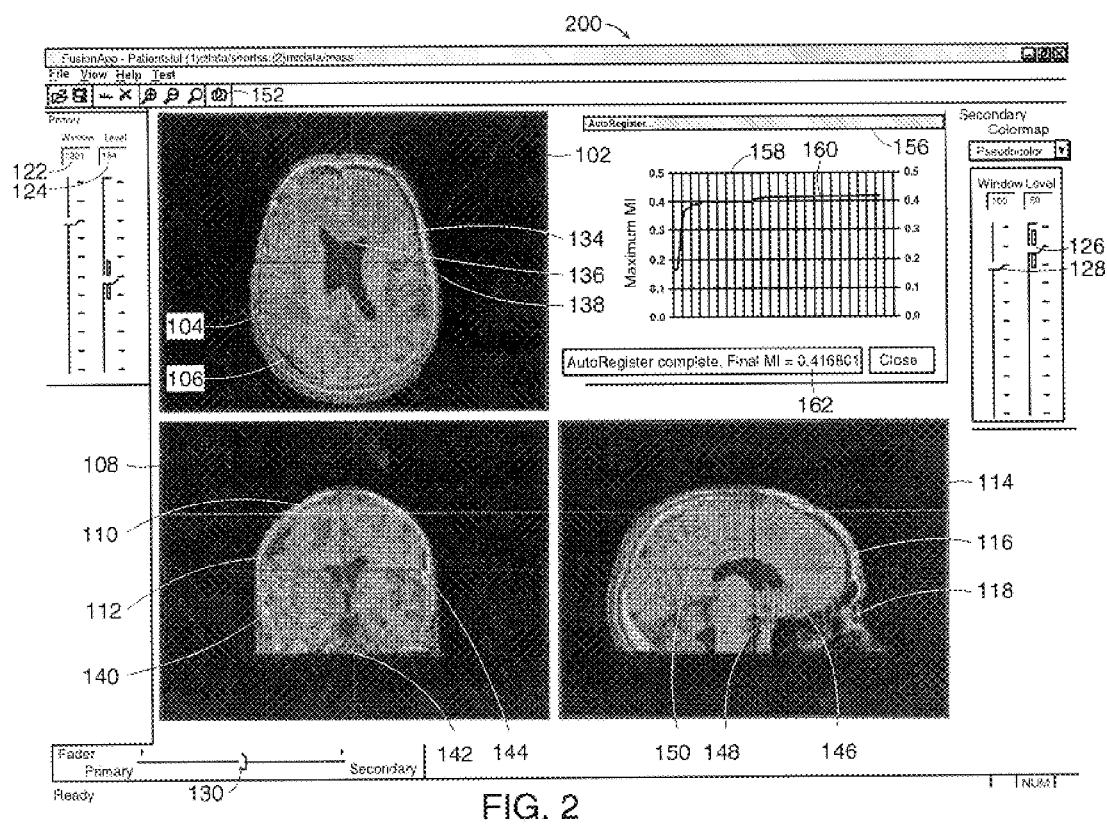
FIG. 2 is a perspective view of the GUI employing the present invention that shows the CT and MRI images in the transverse, coronal and sagittal planes from FIG. 1 aligned.

FIG. 2, shown generally at 200, shows windows 102, 108, and 114 with the primary and secondary image aligned or registered. In FIG. 2, the elements that are the same as those in FIG. 1 have the same reference numbers. The alignment of the primary and secondary images in FIG. 2 is the result of automated alignment techniques according to the present invention It is to be noted that the alignment that takes place is with respect to all three of the plane views, transverse (or axial), coronal, and sagittal, simultaneously.

The progress and accuracy of the automated alignment method is shown in window 156 which contains graph 158 that shows a plot of the value of the mutual information versus iteration number The final MI maximization value is displayed at 160 of window 156. This later value is a very accurate registration of the primary and secondary images so that useful information from each image may be use, for example, in RTP. As automated alignment is being performed, the image displays are updated to reflect the incremental improvements in the alignment. The method by which automated alignment of the primary and secondary image is carried out will now be describe.

Both the display and automated alignment of the present invention require rapid determination of CT or MRI intensities at arbitrary locations in the 3-D primary and secondary data volumes. According to the present invention, translation and rotation of a data volume in a single window will result in the computation of the position in the corresponding plane in the data volume. Correspondingly, the intensities are determined for that plane position Since digital image data occurs only at a finite number of rows, columns, and slices, the viewing lines located between the rows, columns, or slices must estimate the intensities. Likewise, the automated alignment performs a voxel-by-voxel comparison of the overlapping parts of the primary and secondary data of the data volumes. This requires comparing primary voxels at integer row, column, and slice coordinates with transformed secondary voxels at non-integer locations in the primary coordinate system. Accordingly, the present invention has the ability to determine transformed locations and intensities at new locations very rapidly, preferably at a rate of several million or greater per second, to have the GUI views updated without visible lagging. This is accomplished by casting the geometric transformations in an efficient and compact representation and substituting for the time costly multiplication of real (decimal) numbers with serial addition of integers. Moreover, according to the present invention, integer rescaling of the transformations of the secondary data volume is done by bit shifting which facilitates faster results.

To improve the time efficiency of the method of the present invention, there is a determination whether the volume data to be transformed remains in the domain of the display or the overlap volume. The present invention only performs transformations on those voxels which contribute usefully to these functions. Further, to increase the speed of the results, scan line visibility checking may be accomplished before transformation takes place since the geometries of these data and the display coordinate system are known so transformation is not necessary.

As background before discussing the autofusion of the present invention, the CT and MRI data sets that preferably are used, for example, in RTP are sets of samples of a patient's anatomy at regular intervals on a 3-D rectangular grid. CT images represent sections of the anatomy reconstructed from absorption measurements obtained as projections through the patient The reconstruction plane pictures form the transverse or axial plane view of the patient Normally, CT studies have a spatial resolution of 0.7 to about 1 mm/voxel (volume element) in the plane of the reconstructed section images. Typically, CT images have dimensions of 512×512 voxels in the section planes and may have 40 to greater than 100 sections for a study.

MRI images are reconstructed from volumetric magnetization measurements. These images are reconstructed along planes normal to the axis of the patient, so, normally, the images set is formed in the transverse or axial orientation and, therefore, provide comparisons with CT imagery of the same patient. MRI spatial resolutions are approximately 1.5 to 3 mm/voxel in the plane of the reconstructed images. These MRI images normally have dimensions of 256×256 voxels in the section planes. Typically, MRI studies have 30 to greater than 100 sections.

Figures 3, 4:
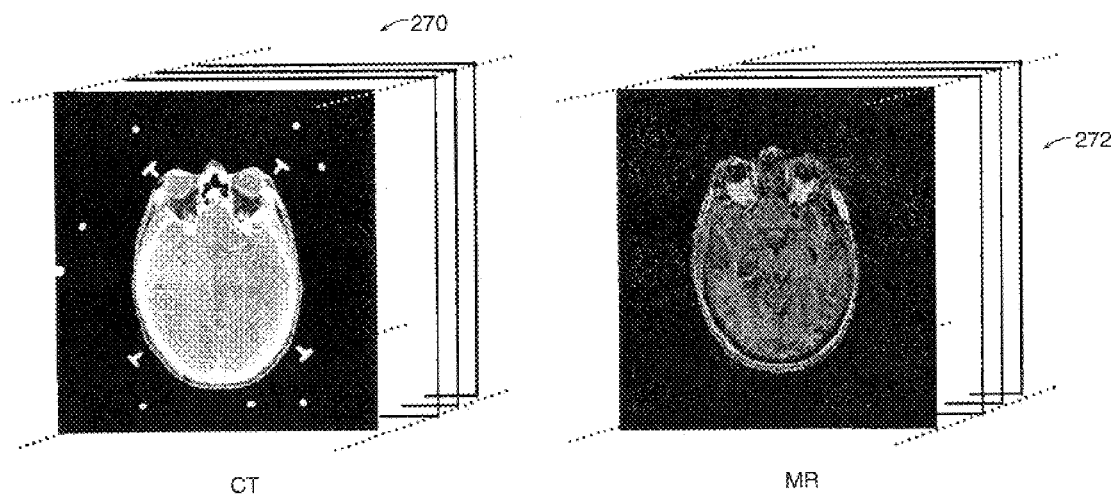
FIG. 3 is a representative drawing of a CT stack containing an image data volume.
FIG. 4 is a representative drawing of a MRI stack containing an image data volume.

The most common presentation of both CT and MRI images is a stack of images showing sections of the patient's anatomy in planes perpendicular to the scanner's axis, and the patient's inferior-superior axis. A representative CT stack which includes a data volume is shown in FIG. 3 generally at 270 and a representative MRI stack which includes a data volume is shown in FIG. 4 generally at 272. The images along the patient's inferior-superior axis are referred to as transaxial (or axial or transverse). Images in planes perpendicular to the anterior-posterior direction are coronal and sagittal images, and are in planes perpendicular to the medial-lateral direction. For description purposes only, the following example of CT and MRI images data sets is provided for a patient that will be using RTP: superior—toward the head; inferior—toward the feet; anterior—toward the top or front of the body or toward the face; posterior—toward the back of the body or head; medial—toward the center of the body or head; and lateral—toward the exterior side of the body or head.

Figure 5:
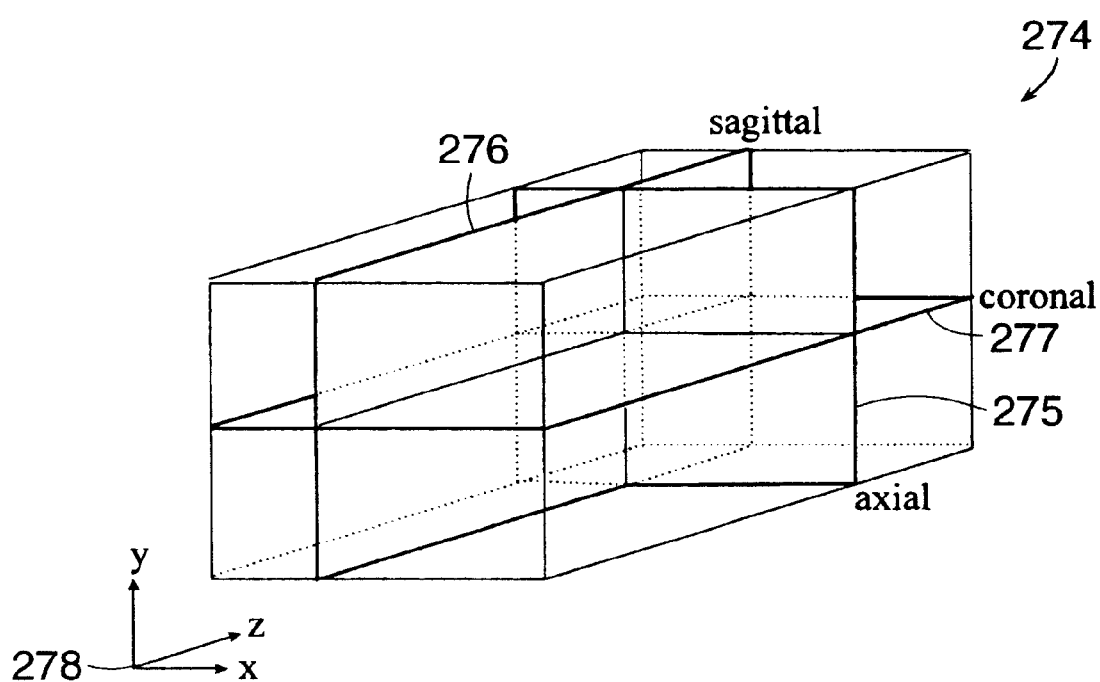
FIG. 5 is a representative drawing of the data volume coordinate system for use in the present invention that shows the transverse (axial), coronal and sagittal planes.

Assuming a supine position of a patient when a CT or MRI scan is performed to produce the data stacks shown in FIGS. 3 and 4, the data volume coordinate system showing the transverse or axial, sagittal, and coronal planes, along with the x, y, and z axes is shown in FIG. 5 generally at 274. In FIG. 5, the axial plane is shown at 275, and the sagittal plane at 276, the coronal plane at 277. The x, y, and z axes are shown generally at 278.

Image data consists of scalar intensities at regular intervals on a 3-D right rectangular grid with orthogonal coordinate axes (x,y,z). The z axis is parallel to the inferior-superior axis or perpendicular to the transverse or axial image sections. The x axis is parallel to the anterior-posterior axis and perpendicular to the coronal image sections. Finally, the y axis is parallel to the medial-lateral axis and perpendicular to the sagittal image sections. The x and y axes lie in the transverse or axial image plane with the origin at the upper left of the image The x axis is parallel to the medial-lateral axis and perpendicular to the sagittal image sections. The y-axis is parallel to the anterior-posterior axis, and perpendicular to the coronal image sections.

Preferably, the image data that is being processed according to the present invention is digital data. As such, the CT and MRI data for the data volumes will be an array of numbers with each number representing a measurement or sample of a tissue property at a point in space. These data points are taken to exist at the centers of voxels which are rectangular volume with a length, width, and height equal to the characteristic spacing between data. The geometry of the data is consistent with a Cartesian coordinate system that has an origin and axes at right angles to each other.

The automated alignment portion of the autofusion method of the present invention is for automatically performing secondary image transformation, which in this case is meant to mean three rotations and three translations of the secondary image with respect to the primary image that will maximally superimpose homologous anatomical points. This optimal transformation, F*, corresponds to the maximum value of the mutual information represented by I(p,F(s)) which relates that primary image data to the transformed secondary image data according to the Expression (1):

$$F^* = \max_F I(p, F(s)) \quad (1)$$

where,

I=is the real value of the MI.

p=is an array of the primary intensities.

F(s)=is the array of the secondary intensities transformed by F.

In most cases, the real-valued rotations and translations relocate the integer-indexed secondary voxels to non-integer locations. Accordingly, the secondary image data must be interpolated to obtain secondary voxel intensities at the primary voxel locations. These interpolated F(s) intensities are to form the marginal and joint probability distributions that are needed to determine the MI.

The determination of the Ml maximization is dependent on an evaluation of the transformations, interpolation, and probability distributions underlying Expression (1). These transformations, interpolation, and probability distributions will now be discussed.

First the coordinate transformations must be considered. A transformed secondary data voxel may be represented by so This value is transformed from the initial state of a secondary data voxel which is represented by $s=(s_x, s_y, s_z)$. The transformation is accomplished by a combination of scaling, translation, and rotation operations. This transformation is represented by Expression (2):

$$s_t = R(v \cdot s - t) \quad (2)$$

where, v=is $(v_x, v_y, v_z)$, the vector of the primary to secondary axis scale ratios.

R=is $(\phi_x, \phi_y, \phi_z)$, the matrix of rotations about the three axes.

t=is $(t_x, t_y, t_z)$, the translation vector.

s=is $(s_x, s_y, s_z)$, the initial secondary data voxel coordinates before scaling, translation, or rotation.

Figure 6:
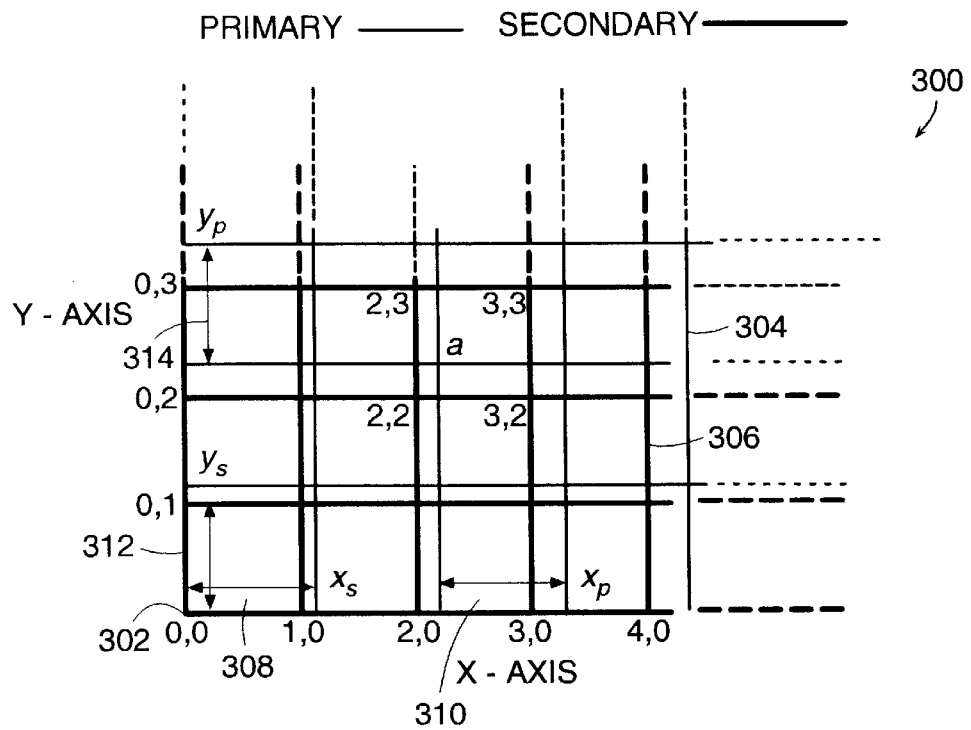
FIG. 6 is an example of a primary and secondary data volumes having different scales.

The representative relationship of the primary and secondary data of the data volumes prior to scaling or translation is shown in FIG. 6, generally at 300. In FIG. 6, the primary and secondary data volumes are shown with the same origin at 302 so that the differences may be readily seen. The primary data is shown at 304 and the secondary data at 306. It also is readily seen that the x and y spacing for the primary and secondary at 308,310 and 312,314, respectively is different. The differences between the primary data volume and the secondary data volume in FIG. 6 is due to scaling differences. As such, before any further alignment can be made, it also is necessary for the secondary data volume to be scaled to primary data volume.

The vector $w_x, v_y, v_z$ is known from scanner calibrations of the image data and it is considered fixed. Therefore, it is only necessary to vary the translations and rotations to obtain an optimal alignment or registration once scaling has taken place.

The necessary coordinate transformations may be performed using matrix multiplication as set forth below. In this case, these transformations may be presented by matrix operations in homogeneous coordinates in which vector translation, rotation, scaling, and skewing operations are combined in one notation. In the three dimensions of the data volume, vectors are represented as 4×1 arrays according to Expression (3):

$$s = (s_x, s_y, s_z, 1)^T = \begin{bmatrix} s_x \\ s_y \\ s_z \\ 1 \end{bmatrix} \quad (3)$$

where, s=the initial vector for the secondary data voxel.

T=transpose of the vector.

Considering FIG. 6, in order to compare the intensity at a point a of the primary image data with the same point in the secondary image data requires interpolating the secondary image data values. The secondary distances $D_s$ are scaled to the primary distances $D_p$, and this may represented by Expression (4):

$$\frac{D_s}{x_s} = \frac{D_p}{x_p}, \frac{D_s}{y_s} = \frac{D_p}{y_p}, \frac{D_s}{z_s} = \frac{D_p}{z_p} \quad (4)$$

The corresponding scaling components are set forth in Expression (5):

$$v_x = \frac{x_s}{x_p}, v_y = \frac{y_s}{y_p}, v_z = \frac{z_s}{z_p} \quad (5)$$

The corresponding transformation is shown in Expression 6 which will be discussed subsequently.

The linear and affine transformations, such translations, rotations, scaling, and skewing, are represented by 4×4 matrices. More particularly with regard to scaling, this is achieved by the multiplication of the vector of scale factors v in a 4×4 matrix (with the components of the vector v on the diagonal) with the 4×1 matrix shown in Expression (3). This is shown in Expression (6):

$$vs = \begin{bmatrix} v_x & 0 & 0 & 0 \\ 0 & v_y & 0 & 0 \\ 0 & 0 & v_z & 0 \\ 0 & 0 & 0 & 1 \end{bmatrix} \begin{bmatrix} s_x \\ s_y \\ s_z \\ 1 \end{bmatrix} = \begin{bmatrix} v_x s_x \\ v_y s_y \\ v_z s_z \\ 1 \end{bmatrix} = s' \quad (6)$$

The determination of s, must made repeatedly for the plurality of secondary data voxels. As such, for efficiency, it is convenient to pre-multiply s times v as shown in Expression (6) The determination of s' according to Expression (6) serves as a resampling equivalent for the secondary image data along all three axes so that the same grid spacing for the secondary image data is achieved as is present in the primary image data.

Figure 7:
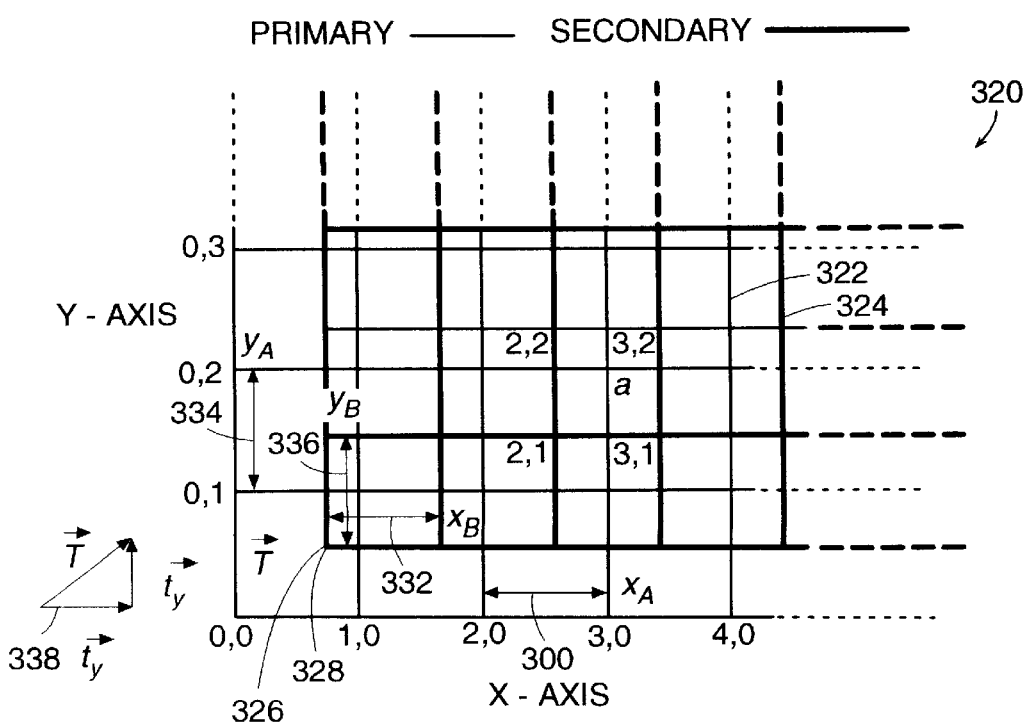
FIG. 7 is an example of primary and secondary data volumes having scaling and translation differences

Referring to FIG. 7, generally at 320, shows a situation in which the secondary data volume differs from the primary data volume by scale factors and a translation $\vec{T}$. The translation difference is the sum of the component translations along x and y, and represented at 338 in FIG. 7.

Taking this into account, the determination of $s_t$ may be based on one translation and one rotation of the secondary image data about each of the three axes as is seen by Expression (7):

$$s_t = R(s' - t) \quad (7)$$

where,

R=is ($\phi_x$, $\phi_y$, $\phi_z$), the matrix of rotations about the three axes.

s'=We product of v and s.

t=is ($t_x$, $t_y$, $t_z$), the translation vector.

The translation of s' by vector t=($t_x$, $t_y$, $t_z$) is represented by the multiplication of this vector by the 4×4 matrix T with the translation components in the fourth column of the matrix, as set forth in Expression (8):

$$s' - t = Ts = \begin{bmatrix} 1 & 0 & 0 & t_x \\ 0 & 1 & 0 & t_y \\ 0 & 0 & 1 & t_z \\ 0 & 0 & 0 & 1 \end{bmatrix} \begin{bmatrix} s'_x \\ s'_y \\ s'_z \\ 1 \end{bmatrix} = \begin{bmatrix} s'_x + t_x \\ s'_y + t_y \\ s'_z + t_z \\ 1 \end{bmatrix} \quad (8)$$

Figure 8:
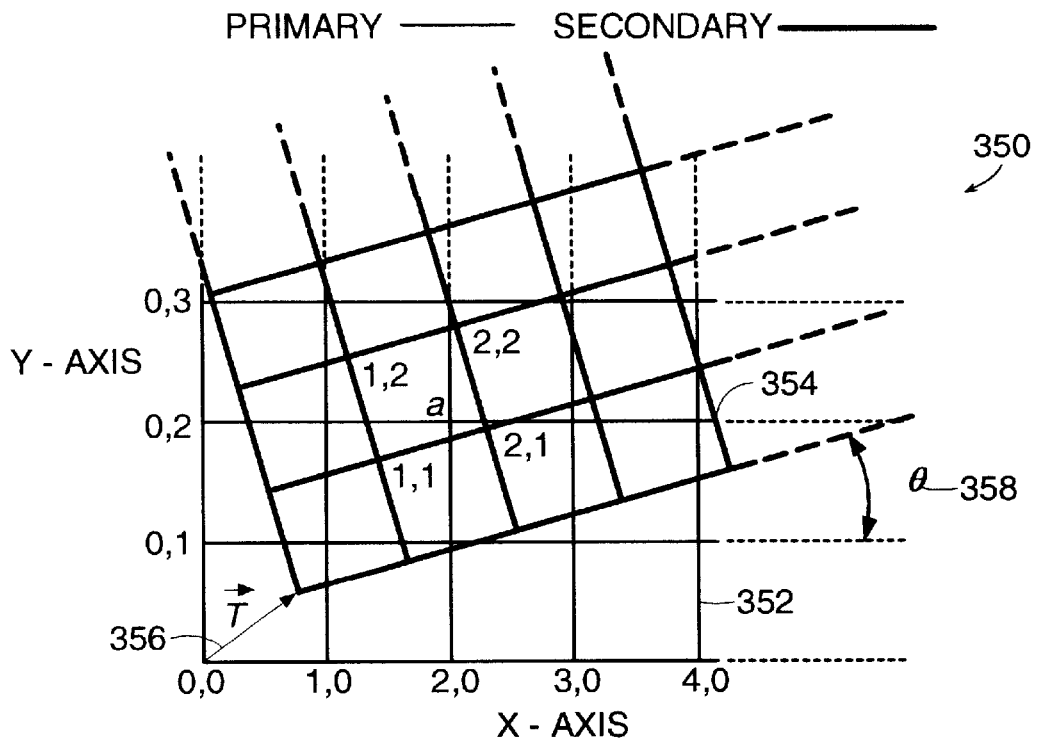
FIG. 8 is an example of primary and secondary data volumes having scaling, translation and rotation differences.

Next the rotations of the secondary image data must be considered. Referring to FIG. 8, generally at 350, the combined offsets due to scaling, translation by $\vec{T}$ at 356, and rotation by angle θ at 358 is shown. In FIG. 8, the primary volume data is shown at 352 and the secondary volume data is shown at 354. The rotations of the secondary image data by the angles $\phi_x$, $\phi_y$, $\phi_z$ about the three coordinate axes is according to Expressions (9), (10), and (11):

$$R(\phi_x) = \begin{bmatrix} 1 & 0 & 0 & 0 \\ 0 & \cos\phi_x & -\sin\phi_x & 0 \\ 0 & \sin\phi_x & \cos\phi_x & 0 \\ 0 & 0 & 0 & 1 \end{bmatrix} \quad (9)$$

$$R(\phi_y) = \begin{bmatrix} \cos\phi_y & 0 & \sin\phi_y & 0 \\ 0 & 1 & 0 & 0 \\ -\sin\phi_y & 0 & \cos\phi_y & 0 \\ 0 & 0 & 0 & 1 \end{bmatrix} \quad (10)$$

$$R(\phi_z) = \begin{bmatrix} \cos\phi_z & -\sin\phi_z & 0 & 0 \\ \sin\phi_z & \cos\phi_z & 0 & 0 \\ 0 & 0 & 1 & 0 \\ 0 & 0 & 0 & 1 \end{bmatrix} \quad (11)$$

The rotation of secondary image data, s', about the z-axis, which will be in the xy plane, is represented by Expression (12):

$$R(\phi_z)s = \begin{bmatrix} \cos\phi_z & -\sin\phi_z & 0 & 0 \\ \sin\phi_z & \cos\phi_z & 0 & 0 \\ 0 & 0 & 1 & 0 \\ 0 & 0 & 0 & 1 \end{bmatrix} \begin{bmatrix} s_x \\ s_y \\ s_z \\ 1 \end{bmatrix} = \begin{bmatrix} s_x \cos\phi_z - s_y \sin\phi_z \\ s_x \sin\phi_z + s_y \cos\phi_z \\ s_z \\ 1 \end{bmatrix} \quad (12)$$

This same type of matrix multiplication is used for the other two axes, $R(\phi_x)s$ and $R(\phi_y)s$.

The combinations of the coordinate transformations may be expressed as the products of the individual transformation matrices. The combined transformation equivalent to the translation followed by rotation of the secondary image data about the z axis is set forth in Expression (13):

$$s_{tr} = R(\phi_z)Ts = \begin{bmatrix} \cos\phi_z & -\sin\phi_z & 0 & 0 \\ \sin\phi_z & \cos\phi_z & 0 & 0 \\ 0 & 0 & 1 & 0 \\ 0 & 0 & 0 & 1 \end{bmatrix} \begin{bmatrix} 1 & 0 & 0 & t_x \\ 0 & 1 & 0 & t_y \\ 0 & 0 & 1 & t_z \\ 0 & 0 & 0 & 1 \end{bmatrix} \begin{bmatrix} s_x \\ s_y \\ s_z \\ 1 \end{bmatrix} \quad (13)$$

-continued $$= \begin{bmatrix} \cos\phi_z & -\sin\phi_z & 0 & 0 \\ \sin\phi_z & \cos\phi_z & 0 & 0 \\ 0 & 0 & 1 & 0 \\ 0 & 0 & 0 & 1 \end{bmatrix} \begin{bmatrix} s_x - t_x \\ s_y - t_y \\ s_z - t_z \\ 1 \end{bmatrix}$$

$$= \begin{bmatrix} (s_x - t_x)\cos\phi_z - (s_y - t_y)\sin\phi_z \\ (s_x - t_x)\sin\phi_z + (s_y - t_y)\cos\phi_z \\ s_z - t_z \\ 1 \end{bmatrix}$$

Noting the determination of $s_{tr}$ above, the computations necessary for homogeneous coordinates may be inefficient unless specially designed hardware systems are used since there are a large number of multiplications by zero and one. As such the present invention utilizes an approach that will produce accurate results without the need for the level of complex computations that have been a problem in the past to perform in a time-efficient manner. This approach will now be described.

The rotations of the secondary image data are all basically 2-D. Thus, they may be restated as 2x2 matrices containing only the sin and cos terms of Expressions (9), (10), and (11) multiplied by the appropriate combinations of x, y, z taken two at a time. These rotations also must be performed with reference to an origin or rotation center. Preferably, the rotation center is not the same point as the primary and secondary data volume origins.

As stated, the origins for the primary and secondary data volumes are at one corner of the rectangular volumes. The rotations of the secondary image data about its origin will introduce large and unpredictable effects in the attempt to find optimal alignment of the common features of the primary and secondary image data. As such, according to the present invention, the rotation center is set at the center of the secondary data volume so that the rotations will leave the secondary volume data largely superimposed on the primary volume data. To carry out this action, there are two translations that are of concern. The first is to translate the secondary data volume center to the coordinate system origin, which preferably will be defined with respect to the primary data volume. The second is to translate the secondary data volume back to its original position. The first translation is represented by Expressions (14) and (15):

$$s_t = C^{-1}RCTs', \quad C = \begin{bmatrix} 1 & 0 & 0 & c_x \\ 0 & 1 & 0 & c_y \\ 0 & 0 & 1 & c_z \\ 0 & 0 & 0 & 1 \end{bmatrix}, \quad C^{-1} = \begin{bmatrix} 1 & 0 & 0 & -c_x \\ 0 & 1 & 0 & -c_y \\ 0 & 0 & 1 & -c_z \\ 0 & 0 & 0 & 1 \end{bmatrix} \quad (14)$$

where,
$s_t$=is the transformed secondary data voxel.
C=is the matrix of the translation of the secondary volume data with its center at ($c_x$, $c_y$, $c_z$) to the coordinate system origin.
$C^{-1}$=is the inverse translation of the C matrix.
R=is ($\phi_x$, $\phi_y$, $\phi_z$), the matrix of rotations about the three axes.
s'=the product of v and s
T=is the transpose of the vector.

Now expanding the rotation term, R, to embrace the rotations in the three axes, the total transformation is represented by Expression (15):

$$s_t = C^{-1}R_zR_yR_xCTs' \quad (15)$$

As previously stated, the rotations about the x, y, and z axes involve changes only to the two coordinates in the plane to that axis. Therefore, with regard to each axis, the information being considered is 2-D rather than 3-D. As a result, this will reduce the 4x4 matrix multiplications, considering Expressions (9), (10), (11), and (12), to a series of 2x2 matrix multiplications, which is shown in Expressions (16), (17), and (18):

$$R_x s' \Leftarrow \begin{bmatrix} \cos\phi_x & -\sin\phi_x \\ \sin\phi_x & \cos\phi_x \end{bmatrix} \begin{bmatrix} u \\ v \end{bmatrix}, u = s'_y, v = s'_z \quad (16)$$

$$R_y s' \Leftarrow \begin{bmatrix} \cos\phi_y & \sin\phi_y \\ -\sin\phi_y & \cos\phi_y \end{bmatrix} \begin{bmatrix} u \\ v \end{bmatrix}, u = s'_x, v = s'_z \quad (17)$$

$$R_z s' \Leftarrow \begin{bmatrix} \cos\phi_z & -\sin\phi_z \\ \sin\phi_z & \cos\phi_z \end{bmatrix} \begin{bmatrix} u \\ v \end{bmatrix}, u = s'_x, v = s'_y \quad (18)$$

where,
$R_x$=is the rotation about the x axis in the y and z plane.
$R_y$=is the rotation about the y axis in the x and z plane.
$R_z$=is the rotation about the z axis in the x and y plane.
u=is the first component.
v=is the second component.

After the translation of the secondary data volume center has been made to the coordinate system origin according to the Expressions (16)–(18), then there will be the translation of the secondary data volume back to its original position. These will provide an error value which now may be used for the remaining automated alignment steps.

As discussed, in carrying out the automated alignment portion of the autofusion method of the present invention, there most likely will be non-integer alignment requiring interpolation to the optimal alignment position of the secondary data volume to the primary data volume. In principle, if the there are two real numbers, for example, a and b, where a<b, and a third number x s positioned between a and b, such that a≦x≦b. Given this, the value of x based on linear interpolation may be determined by Expression (19):

$$x = a\left(\frac{|x-b|}{b-a}\right) + b\left(\frac{|x-a|}{b-a}\right) \quad (19)$$

Thus, linear interpolation in 2-D may be used to resample and reconstruct the secondary volume data in the planes of the primary volume data. In order to effect alignment 2 in the 3-D volume data, the 2-D information may be coupled with nearest neighbor voxel techniques to obtain the desired interpolation without requiring excessive computation time, although other interpolation methods may be used.

Figure 9:
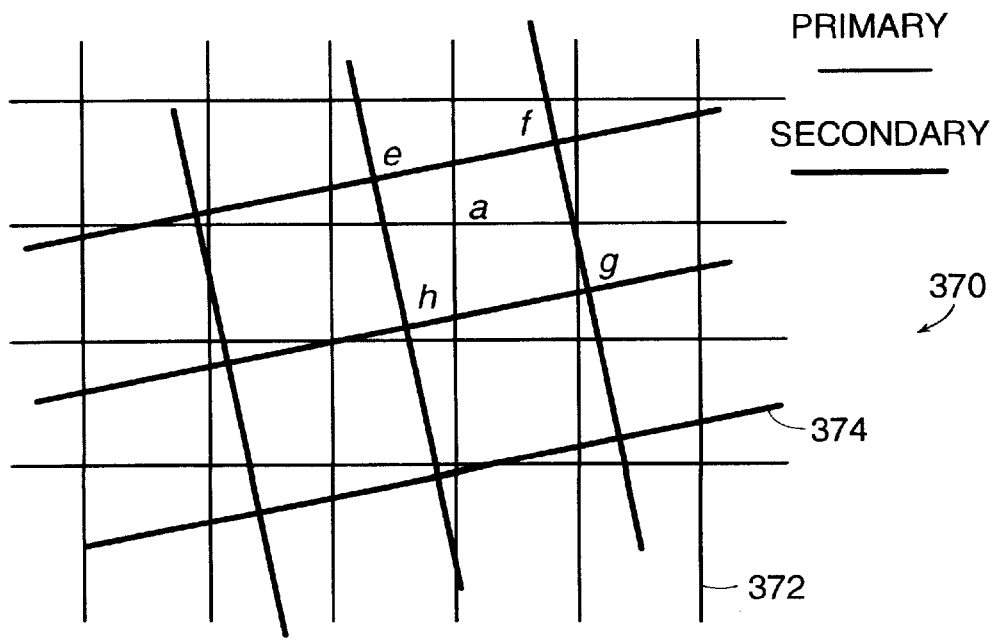
FIG. 9 is an example of data interpolation for the secondary data volume on the primary data volume.

Referring to FIG. 9, generally at 370, there is a representation of a situation in 2-D after transformation of the secondary volume data to the primary coordinate system. The value of the secondary data at point a, S(a), may be determined by interpolation methods such as nearest neighbor, bilinear, B-spline interpolation, or higher polynomial methods. In the Figure, the primary volume data is shown at 372 and the secondary volume data at 374.

In general, the nearest neighbor method requires that the secondary point of interest may be assigned the value of the nearest secondary data point. This may be done by rounding the real valued components x, y, and z to the corresponding nearest integer. Preferably, the present invention uses this interpolation method.

Before discussing MI, an example of the method used to determine the transformations and interpolation, and perform the scan line analysis will be provided. First the two coordinate systems must be related. The alignment of the two 3-D data volumes with different x,y,z scale factors implies the determination of the translations $t_x$, $t_y$, $t_z$ and the rotations $\phi_x$, $\phi_y$, $\phi_z$ which make the corresponding anatomies coincide. Since the complete description of a data volume transformed relative to a fundamental Cartesian coordinate system may be represented in a matrix of its basis vectors, the location of a voxel in one system (the secondary system) transformed to another system (the primary system) may be determined using the systems' basis vectors. Therefore, considering the CT image volume (primary) with basis matrix P, origin offset $\vec{o}_p$, and basis vectors $\vec{p}_x$, $\vec{p}_y$, $\vec{p}_z$, the basis matrix P is according to Expression (20):

$$P = \begin{bmatrix} p_{1x} & p_{2x} & p_{3x} & o_{Px} \\ p_{1y} & p_{2y} & p_{3y} & o_{Py} \\ p_{1z} & p_{2z} & p_{3z} & o_{Pz} \\ 0 & 0 & 0 & 1 \end{bmatrix} \quad (20)$$

The accumulated scaling and rotations are contained in the upper left 3×3 submatrix that is shown in Expression (20). If the origin and axes of the secondary volume data coincide with the fundamental Cartesian coordinate system $\vec{i}$, $\vec{j}$, $\vec{k}$ of the primary volume data, then basis matrix is according to Expression (21):

$$P = \begin{bmatrix} p_{1x} & 0 & 0 & 0 \\ 0 & p_{2y} & 0 & 0 \\ 0 & 0 & p_{3z} & 0 \\ 0 & 0 & 0 & 1 \end{bmatrix} \quad (21)$$

In Expression (21), $p_{1x}$, $p_{2y}$, $p_{3z}$ are the lengths of the $\vec{p}_x$, $\vec{p}_y$, $\vec{p}_z$ vectors projected on the $\vec{i}$, $\vec{j}$, $\vec{k}$ axes. The vector $\vec{p}$ for the voxel at [rows][columns][slices]=[l][m][n] in this system has the form shown in Expression (22):

$$p = Pp_{lmn} = P \begin{bmatrix} l \\ m \\ n \\ 1 \end{bmatrix} = lp_{1x}\vec{i} + mp_{2y}\vec{j} + np_{3z}\vec{k} \quad (22)$$

In Expression (22), the coordinates are shown as integral multiples of the length of the basis vectors.

In the more general system expression at Expression (20), the vector $\vec{p}_{lmn}$ may be shown as Expression (23):

$$\vec{p}_{lmn} = \quad (23)$$

$$P \begin{bmatrix} l \\ m \\ n \\ 1 \end{bmatrix} = \begin{bmatrix} p_{1x} & p_{2x} & p_{3x} & o_{Px} \\ p_{1y} & p_{2y} & p_{3y} & o_{Py} \\ p_{1z} & p_{2z} & p_{3z} & o_{Pz} \\ 0 & 0 & 0 & 1 \end{bmatrix} \begin{bmatrix} l \\ m \\ n \\ 1 \end{bmatrix} = \begin{bmatrix} lp_{1x} + mp_{2x} + np_{3x} + o_{Px} \\ lp_{1y} + mp_{2y} + np_{3y} + o_{Py} \\ lp_{1z} + mp_{2z} + np_{3z} + o_{Pz} \\ 1 \end{bmatrix}$$

In Expression 23, the components of $p_{lmn}$ on the $\vec{i}$, $\vec{j}$, $\vec{k}$ axes are shown in the last term. Each of the basis vectors $\vec{p}_x$, $\vec{p}_y$, $\vec{p}_z$ have components on all the $\vec{i}$, $\vec{j}$, $\vec{k}$ axes thereby requiring the use of a more complicated expression than Expression (22). Expression (23) provides the physical location of voxel [l][m][n] given the integers l,m,n. If matrix P has an inverse $P^{-1}$, then the integer location of a voxel may be determined from its physical location vector $\vec{p}$ per Expression (24):

$$p_{lmn} = P^{-1}\vec{p} \quad (24)$$

Noting the foregoing in this example, a secondary image volume may be represented by a homogeneous basis matrix S as shown in Expression (25):

$$S = \begin{bmatrix} s_{1x} & s_{2x} & s_{3x} & o_{Sx} \\ s_{1y} & s_{2y} & s_{3y} & o_{Sy} \\ s_{1z} & s_{2z} & s_{3z} & o_{Sz} \\ 0 & 0 & 0 & 1 \end{bmatrix} \quad (25)$$

Expression (25) reflects both the origin offset $\vec{o}_s$ and basis vectors $\vec{s}_x$, $\vec{s}_y$, $\vec{s}_z$. Like the primary system, the equivalence of the physical locations in the secondary system and the integer indexed voxels of the secondary volume data are established by the basis matrix according to Expressions (26) and (27):

$$\vec{s} = S\vec{s}_{lmn} \quad (26)$$

$$\vec{s}_{lmn} = S^{-1}\vec{s} \quad (27)$$

M represents a general homogeneous affine transformation matrix. This is shown in Expression (28):

$$M = \begin{bmatrix} m_{1x} & m_{2x} & m_{3x} & t_x \\ m_{1y} & m_{2y} & m_{3y} & t_y \\ m_{1z} & m_{2z} & m_{3z} & t_z \\ 0 & 0 & 0 & 1 \end{bmatrix} \quad (28)$$

where, $$\begin{bmatrix} m_{1x} & m_{2x} & m_{3x} \\ m_{1y} & m_{2y} & m_{3y} \\ m_{1z} & m_{2z} & m_{3z} \end{bmatrix} =$$

is the upper left 3×3 sub-matrix of M containing scaling and rotation information.

$t_x$, $t_y$, $t_z$=the translation vector.

The M matrix of Expression (28) provides that any number of transformation may be combined by multiplying matrices with what is shown as $m_x$, $m_y$, $m_z$.

The transforming of the secondary volume data is equivalent to the matrix product shown in Expression (29):

$$S' = MS \quad (29)$$

The location $\vec{s}'$ of the transformed voxel vector $\vec{s}_{lmn}$ has the fundamental location that is set forth in Expression (30):

$$\vec{s}' = MS\vec{s}_{lmn} = S'\vec{s}_{lmn} \quad (30)$$

In order to display of the intensities of the transformed secondary volume data in the primary volume data coordinate system or to compare secondary voxel intensities with primary voxel intensities, there must be a determination of the location $\vec{s}'$ in the primary coordinate system. To do this, it is necessary to substitute $\vec{s}\,'$ for $\vec{p}$ in Expression (24) and the resulting expression is Expression (31):

$$\vec{p}\,'=P^{-1}\vec{s}\,'=P^{-1}MS\vec{s}_{lmn} \quad (31)$$

Expression (31) will provide the location $\vec{p}$, in the primary coordinate system. Thus, as the steps of the method of the present invention are performed through the secondary volume data lattice, a corresponding lattice of transformed points is determined in the primary coordinate system but at non-integer locations relative to the primary volume data lattice.

The full product of the basis matrices and the transforming matrix in Expression (31) is the homogeneous matrix in Expression (32):

$$P^{-1}MS = X = \begin{bmatrix} x_{11} & x_{21} & x_{31} & x_{41} \\ x_{12} & x_{22} & x_{32} & x_{42} \\ x_{13} & x_{23} & x_{33} & x_{43} \\ x_{14} & x_{24} & x_{34} & x_{44} \end{bmatrix} \quad (32)$$

Figure 10:
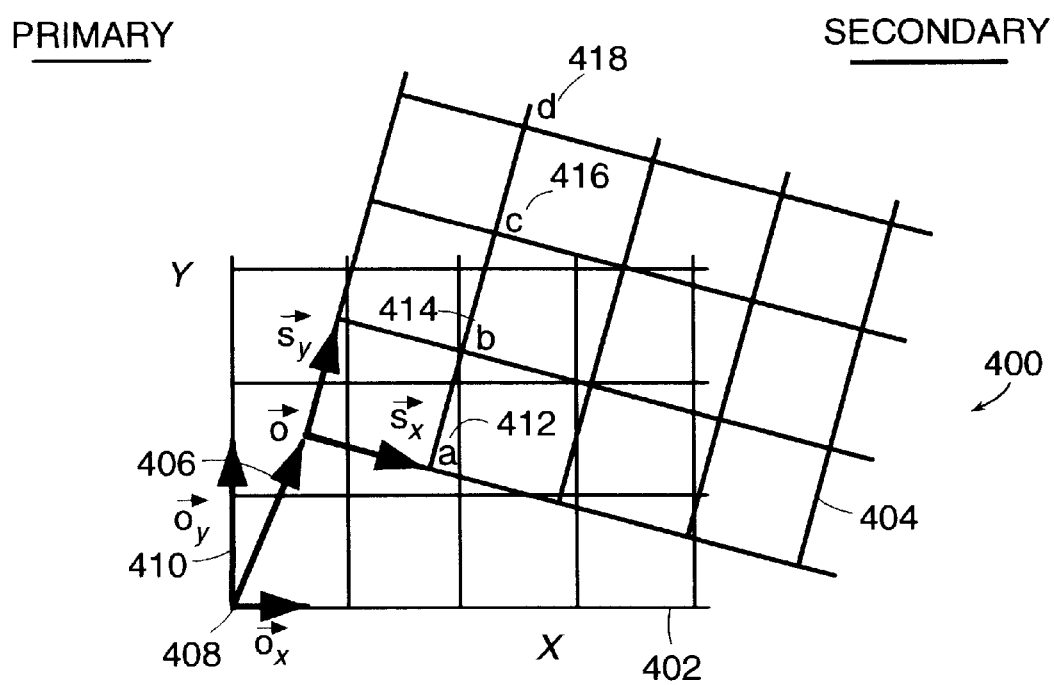
FIG. 10 is an example of the transformation of a secondary data volume onto a primary data volume by iterated, integer-vector addition.

Considering Expression (28) above, the upper left 3×3 sub-matrix of this Expression contains the accumulated product of the rotations about the three axes and the first three elements of the fourth column contain the components of the translations relating the secondary to the primary system origin. In addition, the first the elements of the first three columns are the basis vectors for the transformed coordinate system relative to the $\vec{i}$, $\vec{j}$, $\vec{k}$ axes of the primary coordinate system. The origin offset of the transformed secondary with respect to the primary is $\vec{o} = \vec{o}_x + \vec{o}_y + \vec{o}_z$ and shown in FIG. 10, generally at 400. In FIG. 10, the primary volume data is at 402 and the secondary volume data is at 404. Since FIG. 10 is only a 2-D representation, in the x,y plane, it follows that only the x offset at 408 and y offset at 410 are shown. The origin offset is obtained from X from Expression (32) according to Expression (33):

$$\vec{o}_x=x_{41}\vec{i}, \ \vec{o}_y=x_{42}\vec{j}, \ \vec{o}_z=x_{43}\vec{k} \quad (33)$$

The set of the three basis vectors $\vec{s}_x$, $\vec{s}_y$, $\vec{s}_z$ is found in Expressions (34), (35), and (36):

$$\vec{s}_x=x_{11}\vec{i}+x_{12}\vec{j}+x_{13}\vec{k} \quad (34)$$

$$\vec{s}_y=x_{21}\vec{i}+x_{22}\vec{j}+x_{23}\vec{k} \quad (35)$$

$$\vec{s}_z=x_{31}\vec{i}+x_{32}\vec{j}+x_{33}\vec{k} \quad (36)$$

Expressions (34)–(36) define the integral stepping away from $\vec{o}$ along the transformed secondary axes $\vec{s}_x$, $\vec{s}_y$ as shown in FIG. 10. Stepping along the rows, columns, and slices away from the origin, any successive secondary voxel location may be determined by adding the appropriate vector components. Accordingly, the four data points a at 412, b at 414, c at 416, and d at 418 will have the locations indicated below:

a: $1\vec{s}_x+0\vec{s}_y$ b: $1\vec{s}_x+1\vec{s}_y$ c: $1\vec{s}_x+2\vec{s}_y$ d: $1\vec{s}_x+3\vec{s}_y$ Thus, the transformed secondary locations are obtained by iterated addition of real-time vectors. Further, greater processing time economy may be achieved by rescaling the $\vec{s}_x$, $\vec{s}_y$, $\vec{s}_z$ vectors by multiplying by a large integer, such as 216, then changing from real to integer data types by truncating the fractional part. The result is that the real matrix-vector multiplication has been transformed into integer addition. To rescale the data back to the primary coordinate system, the transformed components are divided by the same factor which is done by bit shifting.

From the geometry of the primary and the transformed secondary volume data, the identity of the voxels that are actually in the field of view on the GUI, or that overlap in space are seen and can be processed. In FIG. 10, some of the voxels on the periphery of the secondary volume data are outside the primary data and would not be used in the automated alignment method of the present invention. Only the useful voxels will be transformed, the remainder are not.

Having now discussed the example with regard to scaling, interpolation, and transformation, MI maximization will be discussed.

Mutual information ("MI") maximization is now used to effect the optimal registration of the secondary volume data with respect to the primary volume data. Initially, there is consideration that primary and secondary volume data A and B, respectively, will have voxel values a and b, respectively. The voxel values are random variables that only assume finite integer value. These finite values will lie in the ranges of values $0 \leq a \leq N_A-1$ and $0 \leq b \leq N_B-1$, where $N_A$ and $N_B$ are the numbers of values observed in each data, respectively. The probability p(a) that a given A-voxel has the value a is defined as the number of voxels with value a, n(a), divided by the number of all voxels in A. This is shown in Expression (37):

$$p(a) = \frac{n(a)}{\sum_{i=0}^{N_A-1} n(i)} \quad (37)$$

The set of all probabilities p(a) form the data set A and will be the probability distribution for a. Moreover, it is also understood that for summation of the probabilities for all of the values of the voxels in A may be expressed as Expression (38):

$$\sum_{i=0}^{N_A-1} p(i) = 1 \quad (38)$$

Therefore, to determine the p(a) from integer voxel data, a histogram of all the n(a) voxel value frequencies is constructed, then normalized according to Expression (37).

An alignment of the primary and secondary data volumes, such that each voxel value a that is part of the primary data $A(a \in A)$ has associated with it a single secondary voxel $b \in B$, will be based on the probability that the a,b combination occurs together according to the joint probability p(a,b) which is set forth in Expression (39):

$$p(a, b) = \frac{n(a, b)}{\sum_{a \in A} \sum_{b \in B} n(a, b)} \quad (39)$$

where, n(a,b)=is the number of occurrences of the a,b combination.

The probability p(a) of observing a voxel with value a is a measure of the uncertainty in predicting this observation. Therefore, for a single random variable A with a possible value a∈A and a distribution p(a) at a given voxel in the primary data volume, the entropy (the measure of the uncertainty in the occurrence of a random variable) is set forth in Expression (40):

$$H(A) = -\sum_{a \in A} p(a) \log p(a) \quad (40)$$

where,

A=is a random variable that has the value a.

logp(a)=is a logarithm in base 2.

The entropy, as it is used here, is a function of the distribution p(a) and is maximized when the distribution of a is uniform, and is minimized if all of the voxels in A have the same value. Referring to Expression (38), the entropy can be termed as a the average of 1/logp(a). Therefore, for the two random variables A and B from the primary and secondary data volumes, the joint entropy is determined by Expression (41):

$$H(A, B) = -\sum_{a=0}^{N_A-1} \sum_{b=0}^{N_B-1} p(a, b) \log p(a, b) \quad (41)$$

where,

A=is a random variable representing the primary data.

B=is a random variable representing the secondary data.

a=is the actual value of random variable A.

b=is the actual value of random variable B.

Given two random variables, one in the primary data volume represented by A and one in the secondary data volume represented by B, which have some unknown but determinable relationship, that relationship may described as will now be set forth. The relative entropy of the two random variables A and B is a measure of the distance between their two probability distributions. The MI is the amount of information one distribution contains about the other. The relative entropy between the two probability distributions, p(a), a∈A and p(b), b∈B, is defined by Expression (42):

$$D(p(a)\|p(b)) = \sum_{a \in A} p(a) \log \frac{p(a)}{p(b)} \quad (42)$$

The relative entropy, D, is viewed as a distance measure in that D(p(a)∥p(b))=0 when p(a)=p(b), for all a,b, and D(p(a)∥p(b))≧0, for all a,b.

MI for the purposes of the present invention is the relative entropy between the joint distribution and the product of the marginal distribution. Therefore, considering Expressions (41) and (42), MI is defined as Expression (43):

$$I(A; B)D = \sum_{a \in A} \sum_{b \in B} p(a, b) \log \frac{p(a, b)}{p(a)p(b)} \quad (43)$$

The MI, I(A;B), is the reduction in uncertainty in A due to the knowledge of B. Therefore, as shown in FIG. 2 at graph 158, as the translations and rotations that have been previously described take place automatically, the MI increases until it reaches the state shown at 160. After this point, the alignment would only be minimally improved with additional computational time. The alignment process according to the present invention will normally range from about 30 seconds to 90 seconds during autofusion.

The terms and expressions that are employed herein are terms or description and not of limitation. There is no intention in the use of such terms and expressions of excluding the equivalents of the feature shown or described, or portions thereof, it being recognized that various modifications are possible within the scope of the invention as claimed

What is claimed is:

1. An autofusion method comprising the steps of:
   (a) generating a first image data volume of a structure using a first modality;
   (b) generating an image data volume of the structure using a second modality;
   (c) processing the first image data volume so that the first image data volume is capable of being selectively displayed;
   (d) processing the second image data volume so that the second image data volume is capable of being selectively displayed;
   (e) selectively displaying at least two different plane views of the first image data volume at two discrete locations on a display means;
   (f) selectively displaying at least two different plane views of the second image data volume at the two discrete locations on the display means, with the plane views of the second image data volume being of a same portion of the structure as the plane views of the first image data volume;
   (g) scaling the plane views of the second image data volume to a scale of the plane views of the first image data volume; and
   (h) aligning the scaled plane views of the second image data volume with the plane views of the first image data volume including the substeps of,
      (1) translating the scaled plane views of the second image data volume to a position in each plane view in which predetermined points of the second image data volume approximate corresponding points in the first image data volume,
      (2) rotating the scaled and translated plane views of the second image data volume to a position in each view in which predetermined points of the second image data volume approximate corresponding points in the first image data volume, with the approximation at step (h)(2) being a closer approximation than the approximation at step (h)(1), and
      (3) substantially simultaneously updating each plane view of the first image data volume with each selection movement with respect to the first image data volume, and
      (4) substantially simultaneously updating each plane view of the second image data volume with each selection and alignment movement with respect to the second data volume.

2. The method as recited in claim 1, wherein the structure is an anatomy.

3. The method as recited in claim 2, wherein the first modality is computed tomography (CT) imaging.

4. The method as recited in claim 2, wherein the second modality is magnetic resonance imaging tomography imaging (MRI).

5. The method as recited in claim 1, wherein step (e) includes selectively displaying at least three different plane views of the first image data volume at three discrete locations on a display means.

6. The method as recited in claim 5, wherein step (f) includes selectively displaying at least three different plane views of the second image data volume at the three discrete locations on the display means, with the plane views of the second image data volume being of a same portion of the structure as the plane views of the first image data volume.

7. The method as recited in claim 6, wherein the three different plane views of the structure include an axial (transverse) view, coronal view, and sagittal view.

8. An autofusion method comprising the steps of:
   (a) generating a first image data volume of a structure using a first modality;
   (b) generating an image data volume of the structure using a second modality;
   (c) processing the first image data volume so that the first image data volume is capable of being selectively displayed;
   (d) processing the second image data volume so that the second image data volume is capable of being selectively displayed;
   (e) selectively displaying at least two different plane views of the first image data volume at two discrete locations on a display means;
   (f) selectively displaying at least two different plane views of the second image data volume at the two discrete locations on the display means, with the plane views of the second image data volume being of a same portion of the structure as the plane views of the frst image data volume;
   (g) aligning the scaled plane views of the second image data volume with the plane views of the first image data volume including the substeps of,
      (1) scaling the plane views of the second image data volume to a scale of the plane views of the first image data volume;
      (2) translating the scaled plane views of the second image data volume to a position in each plane view in which predetermined points of the second image data volume approximate corresponding points in the first image data volume,
      (3) rotating the scaled and translated plane views of the second image data volume to a position in each view in which predetermined points of the second image data volume approximate corresponding points in the first image data volume, with the approximation at step (g)(3) being a closer approximation than the approximation at step (g)(2), and
      (4) substantially simultaneously updating each plane view of the first image data volume with each selection movement with respect to the first image data volume, and
      (5) substantially simultaneously updating each plane view of the second image data volume with each selection and alignment movement with respect to the second data volume.

9. The method as recited in claim 8, wherein the structure is an anatomy.

10. The method as recited in claim 9, wherein the first modality is computed tomography (CT) imaging.

11. The method as recited in claim 9, wherein the second modality is magnetic resonance imaging tomography imaging (MRI).

12. The method as recited in claim 8, wherein step (e) includes selectively displaying at least three different plane views of the first image data volume at three discrete locations on a display means.

13. The method as recited in claim 12, wherein step (f) includes selectively displaying at least three different plane views of the second image data volume at the three discrete locations on the display means, with the plane views of the second image data volume being of a same portion of the structure as the plane views of the first image data volume.

14. The method as recited in claim 13, wherein the three different plane views of the structure include an axial (transverse) view, coronal view, and sagittal view.

15. An autofusion method comprising the steps of:
   (a) generating a first image data volume of a structure using a first modality;
   (b) generating an image data volume of the structure using a second modality;
   (c) processing the first image data volume so that the first image data volume is capable of being selectively displayed;
   (d) processing the second image data volume so that the second image data volume is capable of being selectively displayed;
   (e) selectively displaying at least two different plane views of the first image data volume at two discrete locations on a display means;
   (f) selectively displaying at least two different plane views of the second image data volume at the two discrete locations on the display means, with the plane views of the second image data volume being of a same portion of the structure as the plane views of the first image data volume;
   (g) scaling the second image data volume to a scale of the first image data volume; and
   (h) automatically aligning the scaled second image data volume with the first image data volume using mutual information including the substeps of,
      (1) translating the scaled second image data volume to a position in which each of a plurality of voxels of the second image data volume approximate a position of corresponding voxels in the first image data volume,
      (2) rotating the scaled and translated second image data volume to a position in which each of a plurality of voxels of the second image data volume approximate a position of corresponding voxels in the first image data volume, with the approximation at step (h)(2) being a closer approximation than the approximation at step (h)(1), and
      (3) substantially simultaneously updating each plane view of the first image data volume with each selection movement with respect to the first image data volume, and
      (4) substantially simultaneously updating each plane view of the second image data volume with each selection and alignment movement with respect to the second data volume.

16. The method as recited in claim 15, wherein the structure is an anatomy.

17. The method as recited in claim 16, wherein the first modality is computed tomography (CT) imaging.

18. The method as recited in claim 16, wherein the second modality is magnetic resonance imaging tomography imaging (MRI).

19. The method as recited in claim 15, wherein step (e) includes selectively displaying at least three different plane views of the first image data volume at three discrete locations on a display means.

20. The method as recited in claim 19, wherein step (f) includes selectively displaying at least three different plane views of the second image data volume at the three discrete locations on the display means, with the plane views of the second image data volume being of a same portion of the structure as the plane views of the first image data volume.

21. The method as recited in claim 20, wherein the three different plane views of the structure include an axial (transverse) view, coronal view, and sagittal view.

22. The method as recited in claim 21, wherein the structure is an anatomy.

23. An autofusion method comprising the steps of:
(a) generating a first image data volume of a structure using a first modality;
(b) generating an image data volume of the structure using a second modality;
(c) processing the first image data volume so that the first image data volume is capable of being selectively displayed;
(d) processing the second image data volume so that the second image data volume is capable of being selectively displayed;
(e) selectively displaying at least two different plane views of the first image data volume at two discrete locations on a display means;
(f) selectively displaying at least two different plane views of the second image data volume at the two discrete locations on the display means, with the plane views of the second image data volume being of a same portion of the structure as the plane views of the first image data volume;
(g) automatically aligning the scaled plane views of the second image data volume with the plane views of the first image data volume using mutual information including the substeps of,
(1) scaling the second image data volume to a scale of the first image data volume;
(2) translating the scaled second image data volume to a position in which each of the plurality of voxels of the second image data volume approximate a position of corresponding voxels in the first image data volume,
(3) rotating the scaled and translated second image data volume to a position in each view in which each of a plurality of voxels of the second image data volume approximate a position of corresponding voxels in the first image data volume, with the approximation at step (g)(3) being a closer approximation than the approximation at step (g)(2), and
(4) substantially simultaneously updating each plane view of the first image data volume with each selection movement with respect to the first image data volume, and
(5) substantially simultaneously updating each plane view of the second image data volume with each selection and alignment movement with respect to the second data volume.

24. The method as recited in claim 23, wherein the first modality is computed tomography (CI) imaging.

25. The method as recited in claim 23, wherein the second modality is magnetic resonance imaging tomography imaging (MRI).

26. The method as recited in claim 23, wherein step (e) includes selectively displaying at least three different plane views of the first image data volume at three discrete locations on a display means.

27. The method as recited in claim 26, wherein step (f) includes selectively displaying at least three different plane views of the second image data volume at the three discrete locations on the display means, with the plane views of the second image data volume being of a same portion of the structure as the plane views of the first image data volume.

28. The method as recited in claim 27, wherein the three different plane views of the structure include an axial (transverse) view, coronal view, and sagittal view.

* * * * *